United States Patent

Wu

(10) Patent No.: US 9,924,826 B2
(45) Date of Patent: Mar. 27, 2018

(54) SUBMERSIBLE CIRCULATOR COOKER

(71) Applicant: ANOVA APPLIED ELECTRONICS, INC., San Francisco, CA (US)

(72) Inventor: Jeff Wu, Stafford, TX (US)

(73) Assignee: Anova Applied Electronics, Inc., San Francisco, CA (US)

( * ) Notice: Subject to any disclaimer, the term of this patent is extended or adjusted under 35 U.S.C. 154(b) by 224 days.

(21) Appl. No.: 14/491,961

(22) Filed: Sep. 19, 2014

(65) Prior Publication Data

US 2015/0082996 A1 Mar. 26, 2015

Related U.S. Application Data

(60) Provisional application No. 61/880,714, filed on Sep. 20, 2013.

(51) Int. Cl.
| | | |
|---|---|---|
| *A47J 43/044* | (2006.01) | |
| *B01F 5/12* | (2006.01) | |
| *A47J 27/62* | (2006.01) | |
| *A47J 27/10* | (2006.01) | |
| *G05B 15/02* | (2006.01) | |

(Continued)

(52) U.S. Cl.
CPC ................. *A47J 27/62* (2013.01); *A23L 5/13* (2016.08); *A47J 27/10* (2013.01); *A47J 36/165* (2013.01); *A47J 37/1257* (2013.01); *A47J 37/1266* (2013.01); *A47J 43/044* (2013.01); *B01F 13/003* (2013.01); *F24C 3/085* (2013.01); *G05B 15/02* (2013.01); *G05D 23/1917* (2013.01);

(Continued)

(58) Field of Classification Search
CPC ..... A47J 43/082; A47J 43/044; B01F 13/002; B01F 13/003
USPC .......... 99/348, 330, 403, 409; 219/386, 437; 366/146, 145, 129, 281, 282, 283, 284, 366/286
See application file for complete search history.

(56) References Cited

U.S. PATENT DOCUMENTS

| | | | | |
|---|---|---|---|---|
| 1,703,099 A | * | 2/1929 | Craddock | ............. B01F 13/002 248/299.1 |
| 1,864,149 A | * | 6/1932 | Rockwell | ................. C21D 1/64 261/121.2 |

(Continued)

FOREIGN PATENT DOCUMENTS

| | | |
|---|---|---|
| CN | 102192597 A | 9/2011 |
| GB | 2260002 A | 3/1993 |
| WO | 0152478 A2 | 7/2001 |

OTHER PUBLICATIONS

Extended European Search Report dated Sep. 24, 2015; European application No. 15170165.3.

(Continued)

*Primary Examiner* — Reginald L Alexander
(74) *Attorney, Agent, or Firm* — RatnerPrestia

(57) ABSTRACT

A sous-vide circulator cooker for home or small restaurant sous-vide cooking. The sous-vide circulator cooker is particularly suited for use in home kitchens and on small countertops. The sous-vide circulator cooker can be fully submersed into water and not be adversely affected. The sous-vide circulator cooker includes a detachable skirt which allows for cleaning the skirt itself and cleaning of a heater and ring clamp that can adjust the optimum output location of the pump and account for shallow pots. In at least (Continued)

one embodiment, the sous-vide circulator also contains electrodes that can detect water level.

12 Claims, 4 Drawing Sheets

(51) Int. Cl.

| | | |
|---|---|---|
| *G05D 23/19* | (2006.01) | |
| *H05B 3/68* | (2006.01) | |
| *H05B 6/12* | (2006.01) | |
| *F24C 3/08* | (2006.01) | |
| *A47J 36/16* | (2006.01) | |
| *A47J 37/12* | (2006.01) | |
| *A23L 5/10* | (2016.01) | |
| *B01F 13/00* | (2006.01) | |
| *A47J 43/08* | (2006.01) | |

(52) U.S. Cl.
CPC ............ *H05B 3/68* (2013.01); *H05B 6/1209* (2013.01); *A47J 43/082* (2013.01); *B01F 13/002* (2013.01)

(56) References Cited

U.S. PATENT DOCUMENTS

| | | | | |
|---|---|---|---|---|
| 4,099,406 | A * | 7/1978 | Fulkerson | G01N 27/06 73/304 R |
| 4,612,949 | A * | 9/1986 | Henson | G05D 9/12 137/2 |
| 4,817,217 | A * | 4/1989 | Lively | E04H 4/12 210/138 |
| 4,993,593 | A | 2/1991 | Fabjeno et al. | |
| 5,368,384 | A * | 11/1994 | Duncan | A47J 43/044 219/227 |
| 5,372,422 | A | 12/1994 | Dubroy | |
| 5,412,171 | A | 5/1995 | Yahav | |
| 6,079,486 | A * | 6/2000 | Cennamo | H01L 23/4093 165/185 |
| 6,796,220 | B2 * | 9/2004 | Lee | A23C 11/103 366/146 |
| 8,122,815 | B2 | 2/2012 | Wolfe | |
| 8,172,451 | B2 | 5/2012 | Li | |
| 8,469,678 | B2 | 6/2013 | Preston | |
| 2005/0223910 | A1 | 10/2005 | Hankinson | |
| 2008/0066624 | A1* | 3/2008 | Taylor | A47J 27/10 99/330 |
| 2009/0093983 | A1 | 4/2009 | Trafford | |
| 2010/0090656 | A1 | 4/2010 | Shearer et al. | |
| 2011/0186283 | A1* | 8/2011 | Preston | B01L 7/02 165/287 |
| 2013/0091883 | A1 | 4/2013 | Perez et al. | |

OTHER PUBLICATIONS

Australian Examination Report for Australian Application No. 2014293183.dated Oct. 4, 2017, 3 pages.
Final Office Action for U.S. Appl. No. 14/885,845, dated Aug. 16, 2017, 10 pages.
Chinese Office Action for Chinese Application No. 201480051964.7, dated Sep. 25, 2017, 11 pages.
Notice of Allowance for U.S. Appl. No. 14/727,431, dated Sep. 29, 2017, 8 pages.
Notice of Allowance for U.S. Appl. No. 14/727,444, dated Sep. 5, 2017, 5 pages.
Final Office Action for U.S. Appl. No. 14/727,402, dated Apr. 20, 2017, 8 pages.
Non Final Office Action for U.S. Appl. No. 14/727,402, dated Dec. 14, 2017, 12 pages.

\* cited by examiner

SUBMERSIBLE CIRCULATOR COOKER

CROSS-REFERENCE TO RELATED APPLICATION

This application claims priority from U.S. provisional application No. 61/880,714, filed on Sep. 20, 2014, the contents of which are entirely incorporated by reference herein.

FIELD OF TECHNOLOGY

The present disclosure relates generally to food cooking devices, and more specifically, to precision temperature control water heater and water circulator appliance for cooking food in water baths.

BACKGROUND

Sous-vide is a method of cooking food sealed in airtight plastic bags in a water bath for longer than normal cooking times at an accurately regulated temperature much lower than normally used for cooking, typically around 55° C. (131° F.) to 60° C. (140° F.) for meats and higher for vegetables. Current sous-vide circulators tend to be designed like scientific equipment consisting of an AC motor above the water and shaft attached to a submersed impeller that agitates or pump water. The problem with this type of design is that the entire motor mechanism must stay above water and the integrity of the system is susceptible to accidental drops into the water much like a dropping a hair dryer into the sink. Additionally, AC motors require extensive venting cooling to prevent overheating of the system and is susceptible to steam.

Furthermore, the traditional scientific design leads to restricted configurations that attempt to keep vapors and steam from entering the interior of the circulator device.

BRIEF DESCRIPTION OF THE DRAWINGS

In order to describe a manner in which features of the disclosure can be obtained, reference is made to specific embodiments that are illustrated in the appended drawings. Based on an understanding that these drawings depict only example embodiments of the disclosure and are not intended to be limiting of scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the scope of the disclosure.

Several definitions that apply throughout this document will now be presented. "Circulating" means agitating, blending or mixing of one or more fluids. Hence a "circulator" is a device which can be configured to agitate, blend or mix a fluid. Fluids will be understood to comprise liquids. "Coupled" is defined as connected, whether directly or indirectly through intervening components and is not necessarily limited to physical connections. Coupled devices are devices which are in signal communication with one another. "Connected" means directly connected or indirectly connected. "Sealed" can mean hermetically sealed, mechanically sealed or to make imperious to air and water.

Broadly speaking, this disclosure relates to a sous-vide circulator cooker for home sous-vide cooking. The disclosed devices are particularly suited for use in home kitchens and some limited commercial use in smaller kitchens.

In at least one embodiment, a sous-vide circulator cooker has a turnable or rotatable information display. The display is located on the top and is configured to keep electronics housed therein away from steam and to enable easy viewing from different angles.

In at least one embodiment, a sous-vide circulator cooker includes a detachable skirt which allows for cleaning the skirt itself and cleaning of a heater and pump covered by the skirt. In at least one embodiment, the sous-vide circulator cooker's removable skirt also exposes the water pump impellers allow users to clean out food and debris.

In at least embodiment a sous-vide circulator cooker has a water proof submersible pump where the motor may be located under water, at the water line or above water with inflow and outflow lines. In at least one embodiment of this disclosure, the submersible pump can also be opened without tools for cleaning.

In another embodiment, the entire circulator system is sealed and can be submersed into water whether purposely or by accident.

According to one aspect of this disclosure, a sous-vide circulator cooker has a ring clamp that allows operators to turn the entire system to vector the pump output or to turn the system for better display viewing angle.

Figure 1:
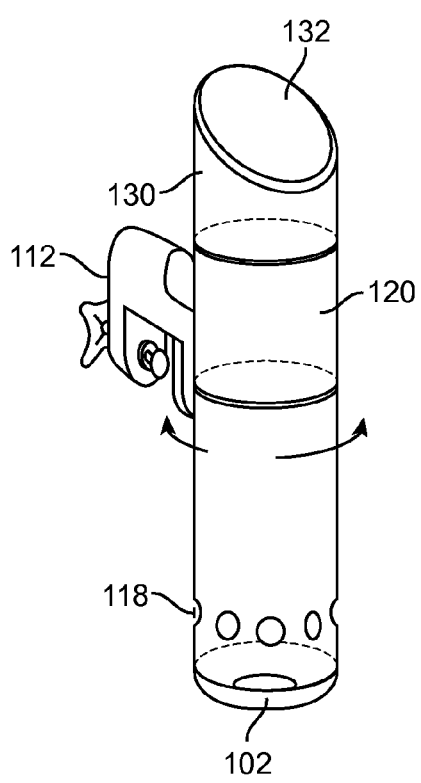
FIG. 1 illustrates a fluidic temperature control device in accordance with an example embodiment.

FIG. 1 illustrates an example embodiment of a fluidic temperature control device. The temperature control device comprises a head portion 130, a middle portion 120 and a lower portion 118. The head portion 130 can include a display device 132 which can display information such as the temperature of the fluid in which the lower portion 118 is at least partially immersed or the speed at which an impeller housed within the lower portion is spinning. The head portion 130 can also include an input device 132 such as one or more buttons or controls which can enable a user to select a temperature for the water in which the lower portion is immersed. The lower portion 118 can be configured with openings 118 through which the heated water can be drawn by an impeller or other agitation device located within the lower portion 118.

Figure 2:
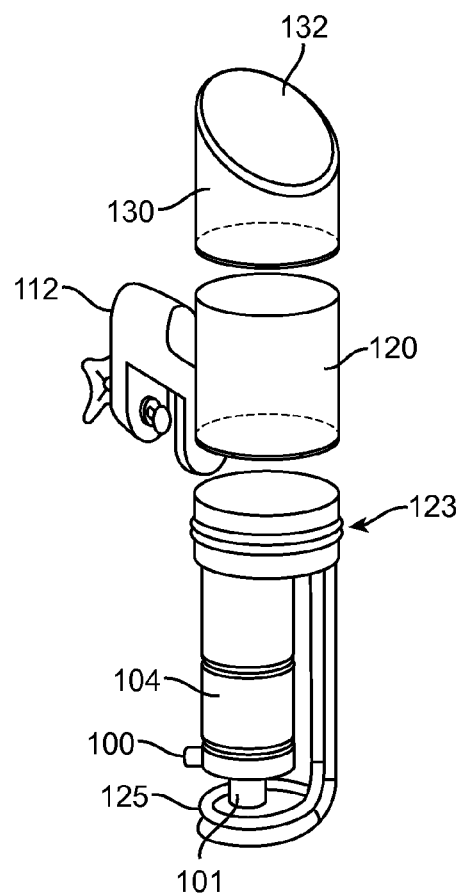
FIG. 2 illustrates a fluidic temperature control device in accordance with another example embodiment.
Figure 3:
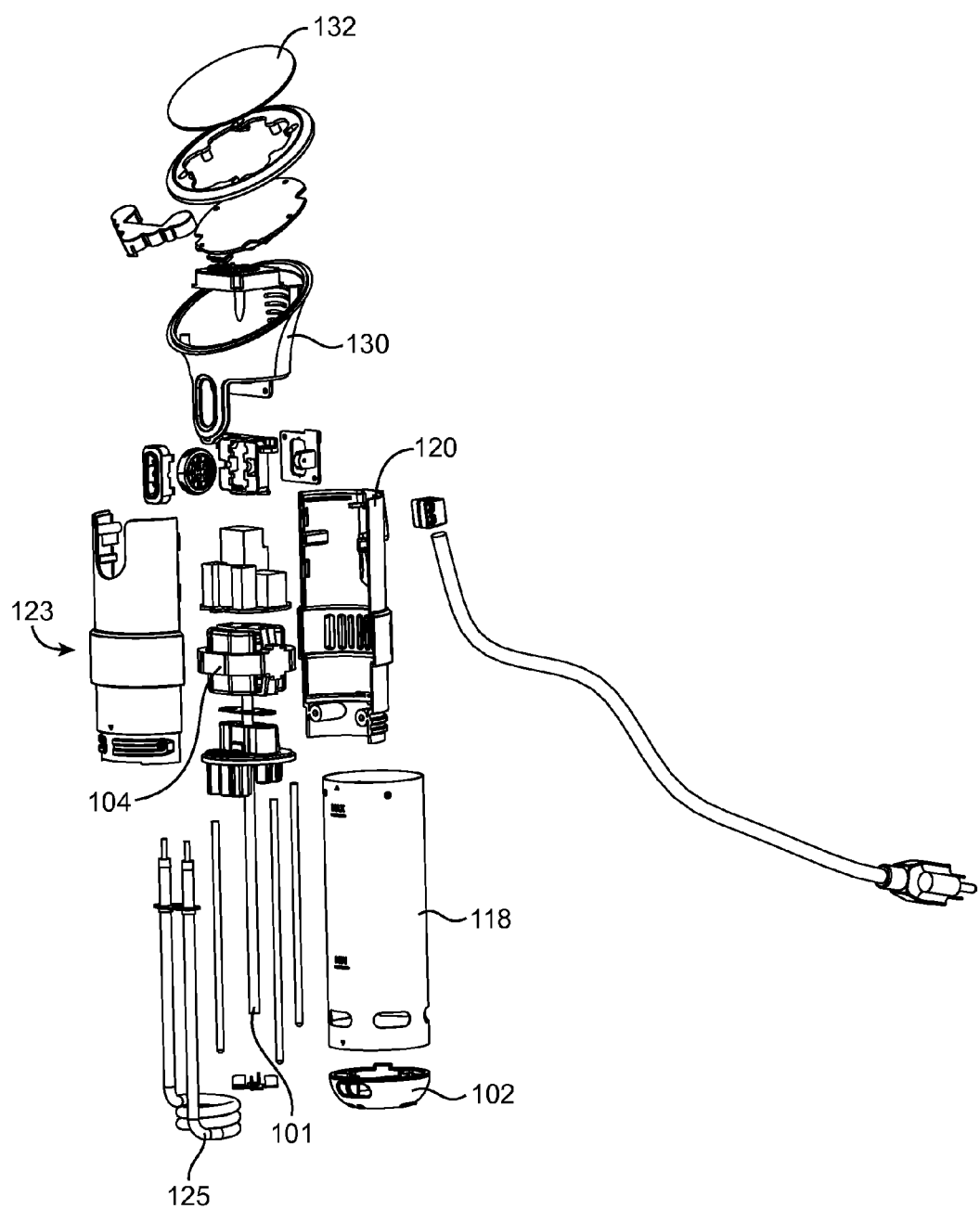
FIG. 3 illustrates a fluidic temperature control device in accordance with another example embodiment.
Figure 4:
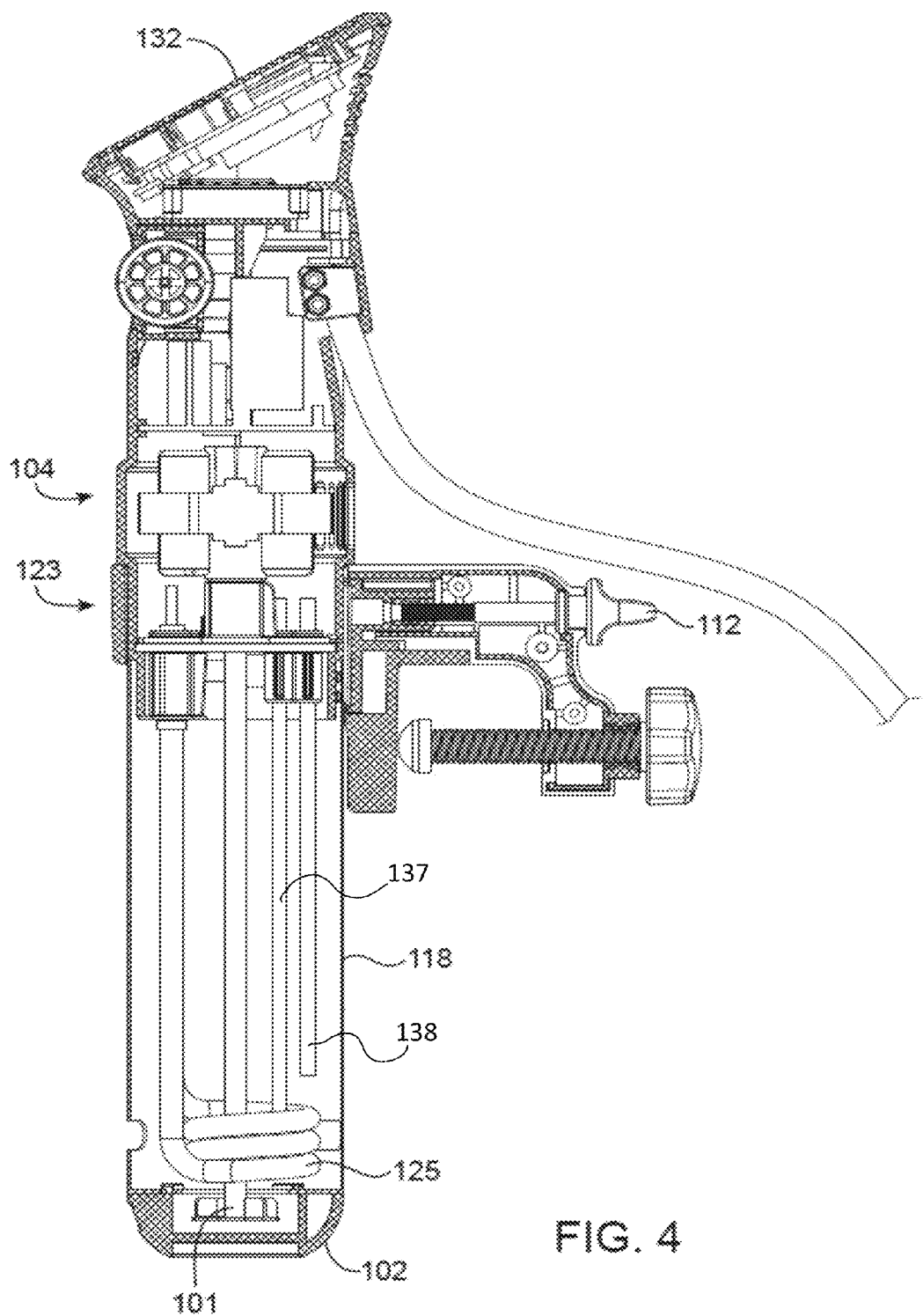
FIG. 4 illustrates a fluidic temperature control device in accordance with another example embodiment.

FIGS. 2-4 illustrate the different components of the embodiment of a fluidic temperature control device. The device can include a removable, tool-less screw or clamp-on circulator pump housing 118. The pump housing 118 can be composed of stainless steel or other suitable materials. The pump housing can be a removable clamp-on on skirt 118. The device can also include a liquid ejection (flow-out) opening 102 at the bottom of the device 10 through which fluid can pass. The skirt 118 can be configured with one or more liquid intake (flow-in) openings 118. The middle portion 120 can comprise a ring clamp 112 attached to the remainder of 120, with control electronics connected to electric heaters 125. Atop the device 10 is a display head 130. The display head 130 can include a LCD display 132 with touch controls. As illustrated, the device is sealed against water/air and can be fully submersed for periods of time in the cooking vessel containing the fluid being heated by the device. Also as illustrated, the device has a submersible pump 104 with removable covers 101 and has a fluid ejection port 100.

Figure 5:
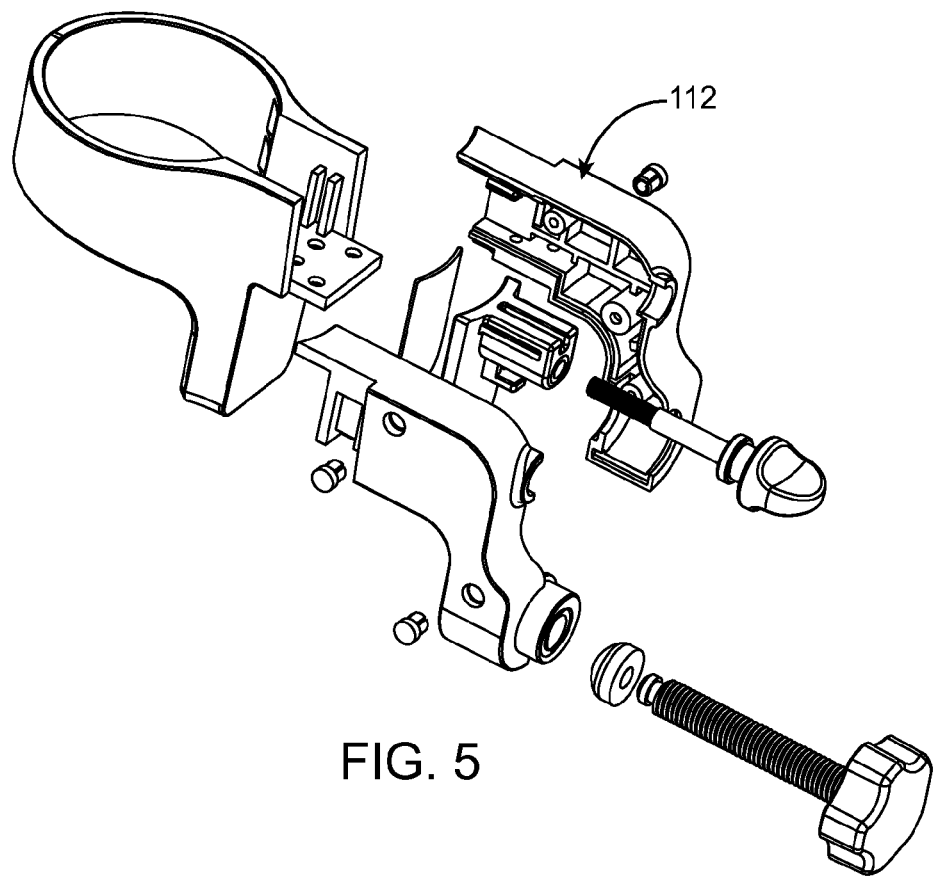
FIGS. 5-6 illustrates a clamping mechanism for a fluidic temperature control device in accordance with an example embodiment.
Figure 6:
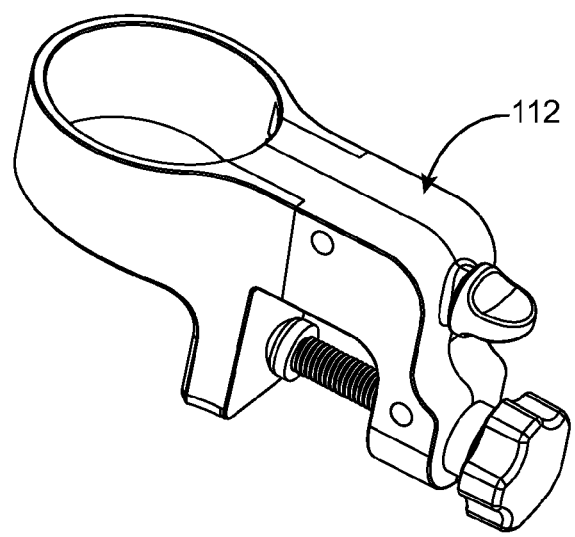

FIG. 5 illustrates an exploded view of an example clamp 112. FIG. 6. illustrates an assembled view of an example clamp 112.

In one embodiment, portions of the sous-vide circulator cooker dynamically changes color depending on operational state of the device.

In one embodiment, a sous-vide circulator cooker includes a housing that defines the shape or form of the device. The housing also encloses and supports internally various electrical components (including motors, fans, and electronics). The housing and shape can also be various shapes rather than cylindrical in appearance.

In one or more embodiments, there is disclosed herein a fluidic temperature control device for sous-vide cooking which includes an upper portion including a controller, a display device and an input device coupled to the controller; a middle portion connected to the upper portion, the middle portion housing a motor coupled to the controller; a lower portion connected to the middle portion, the lower portion housing a fluid agitation device coupled to the motor, a heating element coupled to the controller, and the lower portion configured for at least partial immersion in a fluid.

In some embodiments, the upper portion of the fluidic temperature control is configured to protect the controller, display device and input device from steam during use. In some embodiments, the agitation device is an impeller, or a rotatable blade.

In some embodiments, the lower portion the fluidic temperature control device wherein is composed of at least stainless steel. Additionally, the lower portion can contain slits or openings running along at least a portion of a length of the lower portion. In some embodiments, the lower portion is removable from the middle portion and removal of the middle portion exposes the agitation device. In some embodiments, the upper portion of the fluidic temperature control device is rotatable with respect to the middle portion.

In some embodiments, the heating element is proximate the agitation device. Additionally, the heating element can be housed substantially within the agitation device. In some embodiments, the controller is configurable to control the temperature of the heating element. In some embodiments, the controller is configurable to receive data inputs inputted via the input device, the inputs comprising control commands to control the temperature of the heating element.

In some embodiments the stainless steel skirt can be removed without tools. Additionally, in some embodiments, removal of the stainless steel skirt exposes pump impellers.

At least one embodiment of a fluidic temperature control device for sous-vide cooking can include: an upper portion including a turnable display and an input device coupled to the microprocessor controller; a middle portion connected to the upper portion, the middle portion housing a temperature controller controlled by the microprocessor; and a lower portion connected to the middle portion. The lower portion can house or encase a submersible fluid agitation device including impellers and motor, and a heating element coupled to the temperature controller, the lower portion configured for at least partial immersion in a fluid.

In at least one embodiment, the upper portion and middle portion are sealed, thereby preventing water entry, thereby protecting electronics, the display and other electrical devices within the fluidic temperature control device.

In at least one embodiment, the agitation device can be wholly or partially submersible. The agitation device can include a pump system having a motor and an impeller. The agitation device can also comprise a rotatable impeller blade.

In at least one embodiment, the lower portion housing is composed of at least stainless steel, aluminum or plastic, and is removable without tools. In at least one embodiment, the lower portion contains slits or openings running along at least a portion of a length of the lower portion.

In at least one embodiment, the lower portion can be configured to be removable from the middle portion such that removal of the lower portion exposes the agitation device and heaters.

In at least one embodiment, the middle portion has two adjustable electrodes 137 and 138 that act as a water level sensing mechanism. In at least one embodiment, the heating element is located proximate the agitation device.

In at least one embodiment, the lengths of the electrodes 137 and 138 are adjustable to allow detection of different water levels. In at least one embodiment, the temperature controller is configurable to control the temperature of the heating element.

In at least one embodiment, the microprocessor controller is configurable to receive data inputs inputted via the input device, the inputs comprising control commands to control the temperature of the heating element.

At least one embodiment of a sous-vide circulator cooker within this disclosure comprises: a controller located in a sealed housing; a submersible pump connected to the sealed controller; an adjustable electrodes to detect water level; and a ring clamp enabling the device to be turned.

In at least one embodiment, the entire device can be run submersed in water without negatively impacting operation of the system. In at least one embodiment, the submersible pump can be opened without tools to expose the impeller blades. In at least one embodiment, the electrodes are configurable with attachments that enable adjustment of a length of the electrodes 137 and 138.

In at least one embodiment, the ring clamp adjustable to adjust how deeply at least a portion of the device is submersed into water. In at least one embodiment, the portions of the sealed housing are configured to can change color to provide information regarding an operational state of the device. In at least one embodiment, the submersible pump can include a barb located on the pump outlet containing a tube receiver.

It will be understood that modifications and changes that may be made using the principles described herein without departing from the scope of the disclosure or the following claims.

The invention claimed is:

1. A fluidic temperature control device for sous-vide cooking comprising:
   an upper portion including a display and an input device coupled to a microprocessor controller;
   a middle portion connected to the upper portion, the middle portion housing a temperature controller controlled by the microprocessor;
   a lower portion removably connected to the middle portion, the lower portion housing:

a submersible fluid agitation device including an impeller and a motor, and a heating element coupled to the temperature controller and positioned between the impeller and the motor, the lower portion configured for at least partial immersion in a fluid and including a fluid intake opening above a fluid ejection opening enabling flow of the fluid past the heating element to the impeller and out of the device through the fluid ejection opening; and a ring clamp that can be secured to the middle portion to allow vectoring and vertical height adjustment of the fluidic temperature control device.

2. The fluidic temperature control device of claim 1, wherein the upper portion and middle portion are sealed, thereby preventing water entry, thereby protecting electronics, the display and other electrical devices within the fluidic temperature control device.

3. The fluidic temperature control device of claim 1, wherein the agitation device is a submersible pump system.

4. The fluidic temperature control device of claim 1 wherein the impeller comprises a rotatable impeller blade.

5. The fluidic temperature control device of claim 1, wherein the lower portion is composed of at least stainless steel, aluminum or plastic, and is removable without tools.

6. The fluidic temperature control device of claim 5, wherein the lower portion contains slits or openings running along at least a portion of a length of the lower portion.

7. The fluidic temperature control device of claim 5, wherein removal of the lower portion exposes the agitation device and heaters.

8. The fluidic temperature control device of claim 1, where the middle portion has two adjustable electrodes configured to sense a water level.

9. The fluidic temperature control device of claim 1, wherein the heating element is proximate the agitation device.

10. The fluidic temperature control device of claim 8, wherein the electrodes have adjustable lengths to allow detection of different water levels.

11. The fluidic temperature control device of claim 1, wherein the temperature controller is configurable to control the temperature of the heating element and is configurable to receive data inputs inputted via the input device, the inputs comprising control commands to control the temperature of the heating element.

12. The fluidic temperature control device of claim 1, wherein the ring clamp can be a ring or semicircle, that allows the fluidic temperature control device to be secured to the container while allowing the fluidic temperature control device to be positioned vertically and turned.

* * * * *